US012022222B2

(12) United States Patent
Yang et al.

(10) Patent No.: US 12,022,222 B2
(45) Date of Patent: Jun. 25, 2024

(54) CMOS IMAGE SENSOR PIXEL ARRAY AND READOUT METHOD WITH LED FLICKER MITIGATION

(71) Applicant: SmartSens Technology (HK) Co., Ltd, Kwun Tong Kowloon (HK)

(72) Inventors: Jing Yang, Shanghai (CN); Jiawei Heng, Shanghai (CN); Guanjing Ren, Shanghai (CN)

(73) Assignee: SmartSens Technology (HK) Co., Ltd., Kwun Tong Kowloon (HK)

( * ) Notice: Subject to any disclaimer, the term of this patent is extended or adjusted under 35 U.S.C. 154(b) by 36 days.

(21) Appl. No.: 17/854,836

(22) Filed: Jun. 30, 2022

(65) Prior Publication Data

US 2023/0336892 A1    Oct. 19, 2023

(30) Foreign Application Priority Data

Apr. 14, 2022    (CN) .......................... 202210395093.7

(51) Int. Cl.
*H04N 25/772*    (2023.01)
*H04N 23/73*    (2023.01)
*H04N 25/57*    (2023.01)

(52) U.S. Cl.
CPC ........... *H04N 25/772* (2023.01); *H04N 23/73* (2023.01); *H04N 25/57* (2023.01)

(58) Field of Classification Search
CPC ...... H04N 25/772; H04N 23/73; H04N 25/57; H04N 25/77; H04N 25/75; H04N 25/621; H04N 25/622; H04N 25/59; H04N 25/771
See application file for complete search history.

(56) References Cited

U.S. PATENT DOCUMENTS

| 9,681,083 | B2 | 6/2017 | Shen et al. | |
|---|---|---|---|---|
| 9,936,153 | B1 | 4/2018 | Mao et al. | |
| 10,136,084 | B1 | 11/2018 | Solheim et al. | |
| 11,019,277 | B2 | 5/2021 | Jiang et al. | |
| 2009/0302359 | A1* | 12/2009 | Chen | H04N 25/621 257/292 |
| 2020/0177788 | A1* | 6/2020 | Jiang | H04N 25/585 |
| 2021/0233947 | A1* | 7/2021 | Zang | H01L 27/14605 |
| 2021/0377435 | A1* | 12/2021 | Dai | H04N 25/778 |
| 2022/0408039 | A1* | 12/2022 | Park | H04N 25/766 |

\* cited by examiner

*Primary Examiner* — Lin Ye
*Assistant Examiner* — Tuan H Le
(74) *Attorney, Agent, or Firm* — Eric Karich; Karich & Associates

(57) ABSTRACT

A CMOS image sensor with an imaging array of pixels containing selected pixels wherein illumination from a normal image is received by one set of pixels and illumination from an LED light source is received by another. The readout method serially separates the normal image signal from the LED light sourced signal. The signal from the selected pixels is resilient against saturation and thereby contributes to increased HDR. The image sensor array and readout method may be incorporated within a digital camera.

18 Claims, 7 Drawing Sheets

CMOS IMAGE SENSOR PIXEL ARRAY AND READOUT METHOD WITH LED FLICKER MITIGATION

BACKGROUND OF THE INVENTION

Field of the Invention

This invention relates generally to image sensors, and more particularly to CMOS image sensors with High Dynamic Range (HDR) used for scenes containing LED illumination. An imaging array of pixels contain selected pixels wherein illumination from a normal image is received by one set of pixels and images from or illuminated by an light flicker source (e.g., LED) is received by another set of pixels. The signal from the selected pixels is resilient against saturation and thereby contributes to increased HDR. The image sensor array and readout method may be incorporated within a digital camera.

Description of Related Art

An image capture device includes an image sensor and an imaging lens. The imaging lens focuses light onto the image sensor to form an image, and the image sensor converts the light into electrical signals. The electric signals are output from the image capture device to other components of a host electronic system. The image capture device and the other components of a host electronic system form an imaging system. Image sensors have become ubiquitous and may be found in a variety of electronic systems, for example a mobile device, a digital camera, a medical device, or a computer.

A typical image sensor comprises a number of light sensitive picture elements ("pixels") arranged in a two-dimensional array. Such an image sensor may be configured to produce a color image by forming a color filter array (CFA) over the pixels. The technology used to manufacture image sensors, and in particular, complementary metal-oxide-semiconductor ("CMOS") image sensors, has continued to advance at great pace. For example, the demands of higher resolution and lower power consumption have encouraged the further miniaturization and integration of these image sensors. However, miniaturization has come with the loss of pixel photosensitivity and dynamic range which require new approaches in order to mitigate.

With the decreased pixel size, the total light absorption depth within the substrate becomes insufficient for some light, especially long-wavelength light. This becomes a particular problem for image sensors using backside illumination (BSI) technology wherein the image light is incident upon the backside of the sensor substrate. In BSI technology the sensor Silicon substrate may be only two microns (micrometers) thick which is adequate to absorb blue light but very inadequate to absorb red light which may require ten microns of thickness to be fully absorbed.

Two of the most common exposure methods for the image signals generated on a sensor chip are the rolling shutter mode and the global shutter mode. The rolling shutter mode involves exposing different lines of the sensor array at different times and reading out those lines in a chosen sequence. The global shutter mode involves exposing each pixel simultaneously and for the same length of time similar to how a mechanical shutter operates on a legacy "snapshot" camera.

Rolling shutter (RS) mode exposes and reads out adjacent rows of the array at different times, that is, each row will start and end its exposure slightly offset in time from its neighbor. The readout of each row follows along each row after the exposure has been completed and transfers the charge from each pixel into the readout node of the pixel. Although each row is subject to the same exposure time, the row at the top will have ended its exposure a certain time prior to the end of the exposure of the bottom row of the sensor. That time depends on the number of rows and the offset in time between adjacent rows. A potential disadvantage of rolling shutter mode is spatial distortion which results from the above. The distortion becomes more apparent in cases where larger objects are moving at a rate that is faster than the readout rate. Another disadvantage is that different regions of the exposed image will not be precisely correlated in time and appear as a distortion in the image. To improve signal to noise in the image signal final readout, specifically to reduce temporal dark noise, a reference readout called correlated double sampling (CDS) is performed prior to the conversion of each pixel charge to an output signal by an amplifier transistor. The amplifier transistor may typically be a transistor in a source-follower (SF) or common drain configuration wherein the pixel employs a voltage mode readout. However, there are advantages to incorporating a common source amplifier wherein the pixel employs a current mode readout. The common source amplifier may be used in large area imagers. The current of the photodiode is amplified and the readout circuits integrate the current on a capacitor to a voltage, which is then converted to the digital domain.

Global shutter (GS) mode exposes all pixels of the array simultaneously. This facilitates the capture of fast moving events, freezing them in time. Before the exposure begins all the pixels are reset (RST) to the same ostensibly dark level by draining all their charge. At the start of the exposure each pixel begins simultaneously to collect charge and is allowed to do so for the duration of the exposure time. At the end of the exposure each pixel transfers charge simultaneously to its readout storage node. Global shutter mode can be configured to operate in a continuous manner whereby an exposure can proceed while the previous exposure is being readout from the readout storage nodes of each pixel. In this mode the sensor has 100% duty cycle which optimizes time resolution and photon collection efficiency. There is no artifact in the image of the period of transient readout that occurs in rolling shutter mode. Global shutter can be regarded as essential when exact time correlation is required between different regions of the sensor area. Global shutter is also very simple to synchronize with light sources or other devices.

Global shutter mode demands that a pixel contain at least one more transistor or storage component than a pixel using rolling shutter mode. Those extra components are used to store the image charge for readout during the time period following simultaneous exposure. Again in order to improve signal to noise in the image signal a reference readout is required not only to be performed prior to the conversion of each pixel charge to an output signal by an amplifier transistor but also prior to the transfer of the pixel charge to the extra components of the pixel used to store the image charge during readout.

In summary, rolling shutter can deliver the lowest read noise and is useful for very fast streaming of data without synchronization to light sources or peripheral devices. However it carries risk of spatial distortion especially when imaging relatively large, fast moving objects. There is no risk of spatial distortion when using global shutter and when synchronizing to fast switching peripheral devices it is relatively simple and can result in faster frame rates. Flexibility to offer both rolling shutter and global shutter can be very advantageous.

Irrespective of the readout method it is possible for CMOS image sensors to periodically miss sampling part of an image wherein the scene includes, for example, light source (eg. LED) illumination wherein the light source is operated in Pulse Width Modulation (PWM) mode. It is also possible that in the same scene there are very bright objects wherein a longer exposure time to capture the PWM light source would saturate the imaging of the bright object. An important design metric in image sensors is dynamic range, which is defined as the logarithmic ratio between the largest non-saturating photocurrent and the smallest detectable photocurrent. For a sensor with a fixed saturation charge, also referred to as well capacity, saturation limits the highest signal. Generally, the smallest detectable photocurrent is dominated by reset sampling noise of the photodiode and the floating diffusion. Dynamic Range was defined in order to describe the capability of an image sensor to capture such variant scenes as $20.\log(S/N)$, where S is the maximum illumination tolerated by the sensor without saturating and N the noise measured on a pixel with no illumination falling on it. In several applications, such as automotive applications, the roughly 60 dB dynamic range of a standard CMOS image sensor does not allow retention of all the relevant information content of a captured scene.

The brightness of a light emitting diode (LED) is commonly controlled by the pulse width modulation. For a certain pulse frequency, the width of the repeated pulses determines the brightness of the LED as sensed by a human. The wider the pulse is, the brighter the LED, as sensed by a human. Studies have shown that the human eye can perceive flicker of LEDs at rates of up to 90 Hz, or about 11 milliseconds refresh rate, and anything above that is imperceptible to the human eye. The pulse frequency and the pulse width may not be synchronized with the frame frequency and the capture window of an image sensor. The image sensor may miss capturing an LED pulse, if the pulse width is narrow and if the pulse frequency is lower than the frame frequency of the image sensor. Consequently, some frames capture the LED, and some frames do not capture the LED, causing LED image flickering as captured by the image sensor.

To address the light flicker effect of LED illumination, the exposure period of CMOS image sensors may be extended in some cases. This causes the exposure time to be longer than the flicker frequency of the LED illumination. At least an 11 ms long exposure time is required for a LED light source of 90 Hz. However the signals become saturated within a short period of time, thus reducing the dynamic range of the CMOS Image Sensor and possibly overexposure, which will affect the imaging quality. As a method of preventing overexposure, multi-sampling techniques during the long exposure period have been proposed. However, this method has strict requirements on the sampling period, which may lead to the loss of sampled image information. Therefore, multi-sampling may not completely mitigate the LED light flicker effect.

Many new cars are equipped with LED head lights, tail lights, turn lights, etc. Currently, many traffic lights are using LEDs as well. If the field of view of a camera, for example installed in a car, includes the cars and traffic lights having LEDs, the displayed image of the cars and the traffic lights may include flickering LED lights. The flickering LED light may be wrongly considered as coming from emergency vehicles and may distract the driver and put the driver in danger. Accordingly, image sensors that reduce or eliminate the LED flicker are demanded.

An opportunity exists for improvement of image sensors in which the pixel array has sufficient dynamic range and a pixel array design and readout method to mitigate LED flicker and to capture all the objects within a scene but not become saturated. The present invention fulfills these needs and provides further advantages as described in the following summary.

SUMMARY OF THE INVENTION

The present invention teaches certain benefits in construction and use which give rise to the objectives described below. The present invention provides an image sensor pixel array comprising at least two types of pixels with small pixel cells positioned in the corner spaces between large pixel cells resulting in an alternating arrangement of large and small pixels. The small photodiode (sPD), which has lower sensitivity, is used to image LED illumination. With lower sensitivity the exposure time is effectively extended to ensure that the complete LED pulse is captured without easily reaching overexposure. The large photodiode (LPD), which has higher sensitivity, is used to image conventional scenes. Therefore, the darkness of the landscape may be accurately captured and ensure the dynamic range capability of the CMOS image sensor.

During the signal readout process, the output signals of the large pixels and the small pixels may be transferred to a bitline in a serial or parallel manner by controlling row selection signals rowsel (RS) and rowsel_s (RS_s). For large pixels, the pixel reset signal Vrst and the pixel exposure signal Vsig are sequentially buffered by the source follower (SF). Vrst and Vsig are completely correlated making possible the use of correlated double sampling (CDS) to cancel fixed pattern noise (FPN) and kTC noise. For small pixels, during the long exposure time of at least 11ms, the photo-generated electrons of the small photodiode PD_s are partly transferred to the floating diffusion FD_s. This makes using CDS impractical and invites an inventive solution. Therefore in this invention, in order to improve the readout efficiency of pixel and reduce the time interval between quantizing Vsig and Vrst, the small pixel reads out its image signal Vsig_s, and then reads out its reset signal Vrst_s afterwards.

In the designed pixel cells, double conversion gain (DCG) function may be added to the large pixel cells to increase conversion gain and HDR. The voltage potential of the small pixels floating diffusion FD_s can be adjusted by including a coupled capacitor, which can improve the effect of long exposure.

Also typically in the prior art collecting light in one pixel from an adjacent pixel is undesirable. The scattering between pixels is typically weak in a well-designed pixel but in the invention at least the idle adjacent pixel rows may have their transfer transistors and reset transistors continuously conducting to empty the charges in their corresponding pixel cells. This may prevent the charges generated by idle pixels from spilling over to adjacent pixels, affecting the charge accumulation of normally exposure rows. Therefore, the phenomenon of blooming may be effectively reduced.

In summary a primary objective of the present invention is to provide an image sensor pixel array and read out method having advantages not taught by the prior art. Another objective is to provide a pixel array that occupies achieves high dynamic range with a simple manufacturing methodology and reduce manufacturing cost for an HDR image sensor. Another objective of the present invention is to provide LED illumination flicker mitigation (LFM). Finally the solution provided by the present invention may enable those skilled in the art to adapt existing exposure methods, pixel circuits, readout circuits, etc. to meet their needs according to actual needs. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, an image sensor with pixel array with signal dynamic range enhancement components to provide LED illumination flicker mitigation. Various embodiments of the image sensor are disclosed herein. In the following description, numerous specific details are set forth in order to provide a thorough understanding of the present invention. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

The terms "coupled" and "connected", which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either a direct connection or an indirect connection between two circuit elements. For example, two coupled elements may be directly coupled by way of a metal line, or indirectly connected by way of an intervening circuit element (e.g., a capacitor, resistor, or by way of the source/drain terminals of a transistor). In the present invention electrical interconnects on the chip will most commonly be formed on the front sides of the chip. When reference is made to certain circuit elements residing within or formed in a substrate this is generally accepted to mean the circuits reside on the front side of the substrate. The term "adjacent" means next to or adjoining something else. The term "scattered" means redirected as light scattered and/or diffract from one pixel into an adjacent one.

Figure 1:
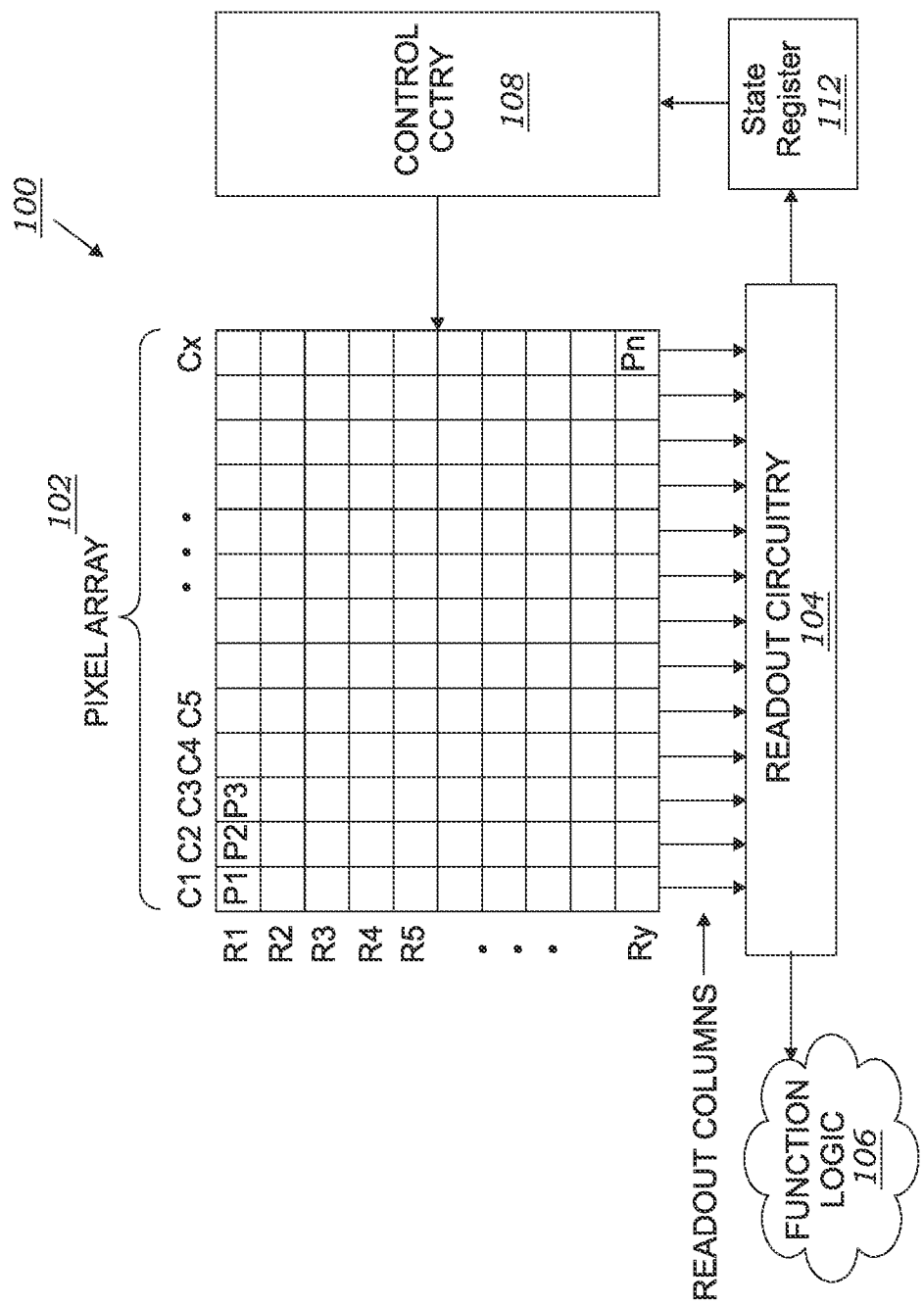
FIG. 1 is a diagram illustrating one example of an imaging system including a pixel array having improved high dynamic range included in an integrated circuit system according to the prior art.

FIG. 1 is a diagram illustrating one example of an imaging system 100 including an example pixel array 102 having a plurality of image sensor pixels included in an example integrated circuit system with features in accordance with the prior art and the teachings of the present invention. As shown in the depicted example, imaging system 100 includes pixel array 102 coupled to control circuitry 108 and readout circuitry 104, which is coupled to function logic 106. Control circuitry 108 and readout circuitry 104 are in addition coupled to state register 112. In one example, pixel array 102 is a two-dimensional (2D) array of image sensor pixels (e.g., pixels P1, P2 . . . , Pn). As illustrated, each pixel is arranged into a row (e.g., rows R1 to Ry) and a column (e.g., column C1 to Cx) to acquire image data of a person, place, object, etc., which can then be used to render a 2D image of the person, place, object, etc. In one example, after each pixel has acquired its image data or image charge, the image data is readout by readout circuitry 104 using a readout mode specified by state register 110 and then transferred to function logic 106. In various examples, readout circuitry 104 may include amplification circuitry, analog-to-digital (ADC) conversion circuitry, or otherwise. State register 112 may include a digitally programmed selection system to determine whether readout mode is by rolling shutter or global shutter. Function logic 106 may simply store the image data or even manipulate the image data by applying post image effects (e.g., crop, rotate, remove red eye, adjust brightness, adjust contrast, or otherwise). In one example, readout circuitry 104 may readout a row of image data at a time along readout column lines (illustrated) or may readout the image data using a variety of other techniques (not illustrated), such as a serial readout or a full parallel readout of all pixels simultaneously. In one example, control circuitry 108 is coupled to pixel array 102 to control operational characteristics of pixel array 102. Some aspects of the operation of control circuitry 108 may be determined by settings present in state register 112. For example, control circuitry 108 may generate a shutter signal for controlling image acquisition. In one example, the shutter signal is a global shutter signal for simultaneously enabling all pixels within pixel array 102 to simultaneously capture their respective image data during a single acquisition window. In another example, the shutter signal is a rolling shutter signal such that each row, column, or group of pixels is sequentially enabled during consecutive acquisition windows.

Figure 2:
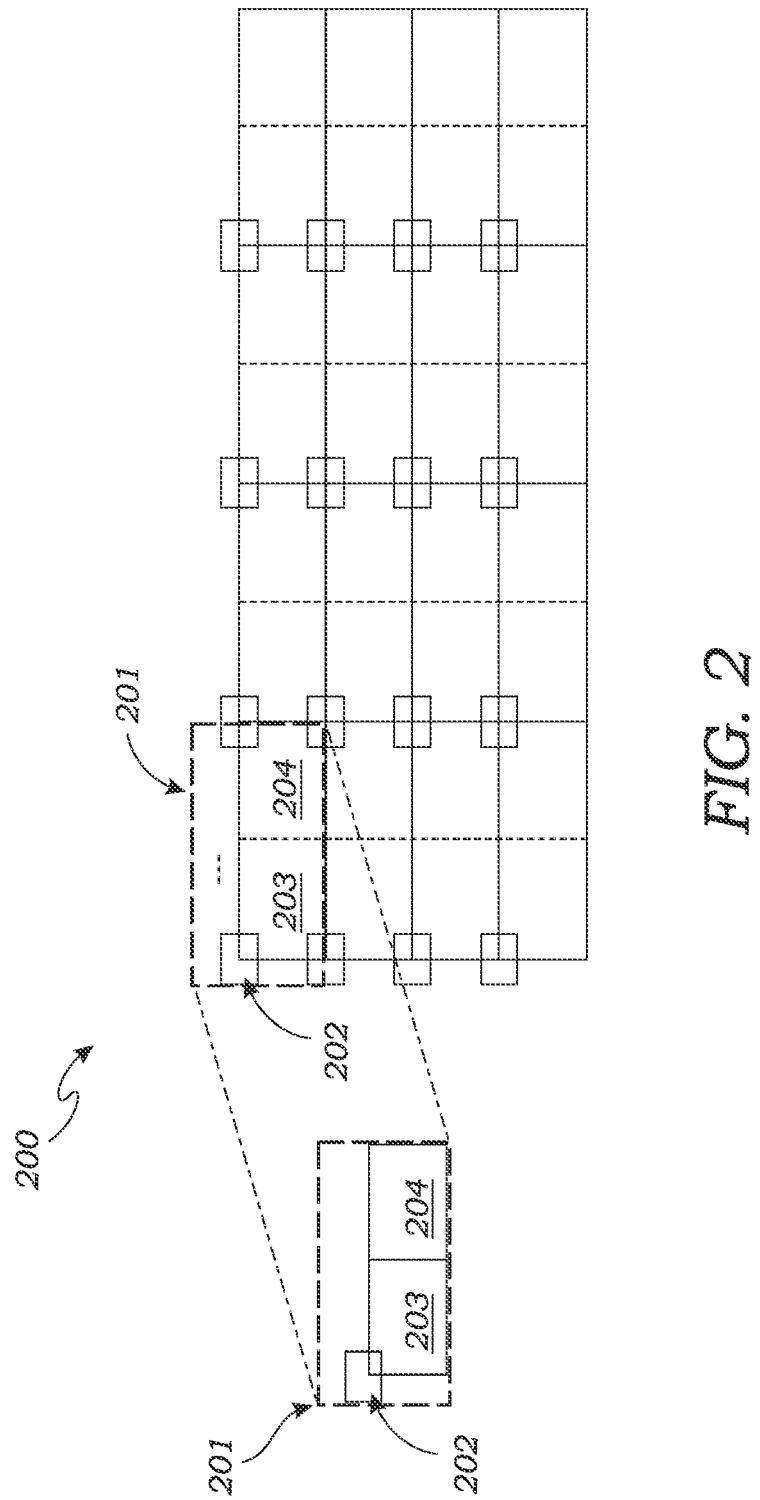
FIG. 2 is a diagram illustrating one example of an imaging system including a pixel array having improved high dynamic range included in an integrated circuit system to provide LED illumination flicker mitigation according to the present invention.

FIG. 2 is a diagram illustrating one example of an imaging system including a pixel array 200 having improved high dynamic range included in an integrated circuit system to provide LED illumination flicker mitigation according to the present invention. Pixel array 200 is comprised of pixel sub-arrays 201 arranged in rows and columns. Pixel sub-arrays 201 are in turn comprised of three constituent pixels 202, 203 and 204. Constituent pixels 203 and 204 form an adjacent pair and are substantially the same and have large photodiodes (LPD) defining their size. Constituent pixel 202 has a small photodiode (sPD) defining its size and is positioned on a corner of the adjacent pair that is not one of the adjacent corners. It can be readily seen that an array 200 of any number of rows and columns can be formed by combining pixel sub-arrays 201 as needed. In one embodiment of the invention the normal scene illumination is imaged by the pixels 203 and 204 while the LED related illumination is imaged by the pixels 202. In another embodiment of the invention imaging array 200 may be comprised of pixel sub-arrays that may have one small pixel like pixel 202 and one large pixel like 203. In yet other embodiments of the invention imaging array 200 may be comprised of pixel sub-arrays that may have one small pixel like pixel 202 and three or more large pixels like 203 in various arrangements. In an embodiment, the pitch of the second constituent pixel is three times that of the constituent first pixel. Of course, the size of the first constituent pixel and the second constituent pixel and the area of each photodiode can be set according to actual needs and are not limited to the above examples.

In an embodiment, the pixel array also includes one or more attenuation layers, and there is at least one attenuation layer disposed between the first photodiode and an incident light, so that the sensitivity of the first photodiode is lower than that of the second photodiode. The attenuation layer may adopt existing attenuation structures. For example, an material layer, or a metal grid are arranged between the photoelectric conversion element and the incident light. The attenuation layer is facing a light-receiving surface of the first photodiode. In another embodiment, the attenuation layer may be further extended to the second photodiode.

Imaging pixel array 200 then incorporates a small pixel array into a traditional pixel array of larger pixels resulting in an alternating arrangement of small and large pixels (or large pixel duplets, or triplets, etc.). Small pixels 202 have small photodiodes sPD and thereby lower sensitivity to illumination than do large pixels 203 and 204 which have higher sensitivity by comparison due to having large photodiodes LPD. With lower sensitivity small pixels 201 can withstand longer exposure times before saturating and thereby are useful in imaging the LED illumination which generally requires an 11ms capture period to avoid the effect of flicker. With the large pixels assigned to image conventionally illuminated scenes their higher sensitivity allows the dark and light elements to be captured with higher dynamic range which would otherwise be hampered if they were to image the LED illumination as well.

The readout scheme of the composite imaging array is one key element of the invention that facilitates the imaging of both the LED illuminated and conventionally illuminated scenes. During the imaging signal readout process the output signals of the large and small pixels are transferred to the bit line in a serial or parallel manner by controlling the row selection signals rowsel and rowsel_s. For the large pixels the pixel reset signal Vrst and the pixel exposure signal Vsig are sequentially buffered by the source follower (SF). Vrst and Vsig are completely correlated. With that correlation readout CDS (Correlated Double Sampling) can be employed to cancel fixed pattern noise (FPN) and kTC noise. In one embodiment of the invention Double Conversion Gain(DCG) is employed with the large pixels. From another feature in the readout scheme the imaging signal from the small pixels, which can exposed for a longer time(about 11 ms, etc.), is only gradually and partially transferred out of the pixels. This prevents the use of readout CDS for the small pixel array. One inventive key element then is to read out the small pixels imaging signal Vsig_s first and then follow that by reading out the reset signal Vrst_s. The signal acquisition dynamic range from the small pixels can be improved by the addition of a coupling capacitor on their associated floating drain FD_s to effectively reduce the small pixel conversion gain.

An additional inventive feature provides for the idle pixel rows, i.e., the ones not being currently read out or not being currently exposure or not being currently AZ, to be continuously drained of signal charge by having their transfer transistors and reset transistors turned on. This prevents charges generated by these adjacent idle pixels from spilling over into the pixels being read out and thereby reduces the incidence of blooming.

Figure 3:
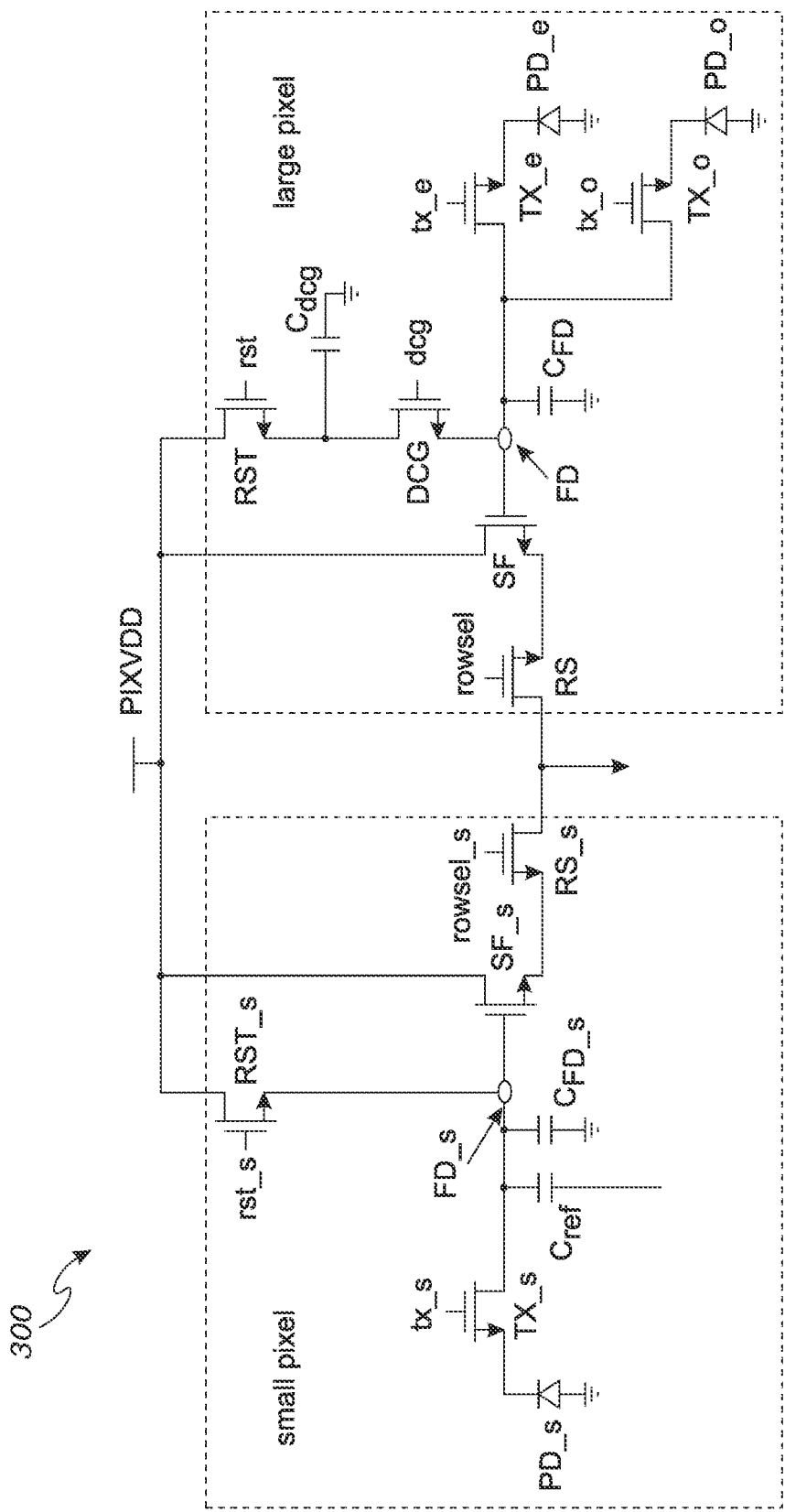
FIG. 3 is a circuit schematic diagram illustrating one example of a pixel circuit elements forming a pixel array according to embodiments of the invention.

FIG. 3 is a circuit schematic diagram illustrating one example of a pixel circuit elements 300 forming a pixel sub-array like pixel sub-array 201 as illustrated in FIG. 2 and according to embodiments of the invention. As illustrated in FIG. 3 the pixel sub-array comprises a small pixel and two large pixel, which actually comprises two large shared photodiodes. The small pixel includes a reset transistor RST_s with control signal rst_s, a small photodiode PD_s, a transfer transistor TX_s with control signal tx_s, a floating drain FD_s with its parasitic capacitance $C_{FD\_S}$ shown, a source follower transistor SF_s, and a row select transistor RS_s with control signal rowsel_s by which the imaging signals are output as vpixel to a column Analog to Digital Converter (ADC). The small pixel is powered by power supply PIXVDD. The various functions of these circuit elements are well known in the art. Also shown is an optional adjustable reference capacitor Cref connected between floating drain FD_s and an adjustable voltage reference vref.

The large pixels include a reset transistor RST with control signal rst, large photodiodes PD_e and PD_o, a corresponding transfer transistor TX_e with control signal tx_e, and a corresponding transfer transistor TX_o with control signal tx_o, a floating drain FD with its parasitic capacitance $C_{FD}$ shown, a source follower transistor SF, and a row select transistor RS with control signal rowsel by which the imaging signals are output as vpixel to a column Analog to Digital Converter (ADC). The large pixel is powered by power supply PIXVDD. The various functions of these circuit elements are well known in the art. Also shown is an optional dual control gain (DCG) transistor DCG with control signal dcg connected between reset transistor RST and floating drain FD with its parasitic capacitance Cdcg for use in modifying the large pixel conversion gain. When the amount of incident light is high transistor DCG is activated to increase the capacitance of floating drain FD in order to reduce conversion gain while when the amount of incident light is low transistor DCG is turned off to limit the capacitance of floating drain FD to $C_{FD}$ and thereby increase conversion gain. As is known in the art the use of transistor DCG improves dynamic range in the imaging system.

Figure 4:
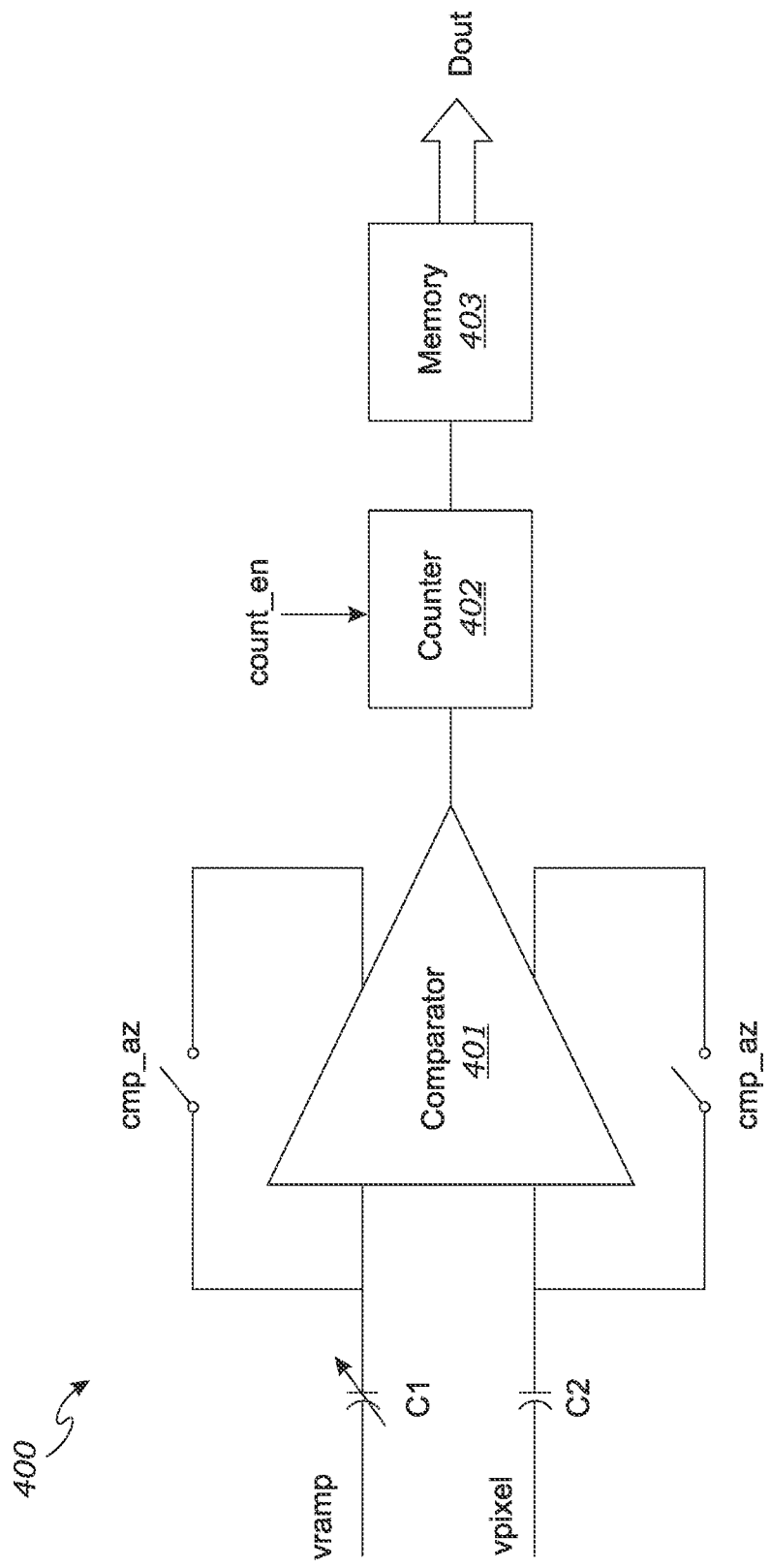
FIG. 4 is a functional block diagram of a column readout circuit of an image sensor pixel array according to embodiments of the invention.

FIG. 4 is a functional block diagram of a column readout circuit 400 of an image sensor pixel array according to embodiments of the invention. In the invention a single slope ADC is used. A slope type ADC is a type of analog-to-digital converter that converts an unknown input voltage into a digital representation through the use of an integrator. Single and dual slope ADCs are the types that convert the analog signals using integrated circuits and integrated circuits are designed using operational amplifiers. In a single slope ADC, a reference voltage is integrated as long as it is equal to the input. A counter keeps running during the period of integration and the counter value at the instant where the integrated value equal the input is the digitized value. The slope and counter are such that the counter reaches all 1's code when an input voltage is equal to a reference voltage.

The input voltage is applied to the positive terminal of a comparator while the reference voltage is obtained after being integrated through the integrator. Both of the voltages get compared through the comparator. The input voltage is a function of time t. The reference voltage keeps on integrated until the output voltage of the comparator becomes equal to the input voltage.

As illustrated in FIG. 4 the readout circuit used in the invented imaging system includes comparator 401, counter 402 with its control signal count_en, memory 403 and ancillary switches cmp_az and coupling capacitors C1 and C2. During operation reference voltage vramp is compared to imaging signal vpixel to execute the A to D conversion of vpixel to output values Dout. The detailed operational steps of the single slope ADC are are described generally above and are known in the art.

Figure 5:
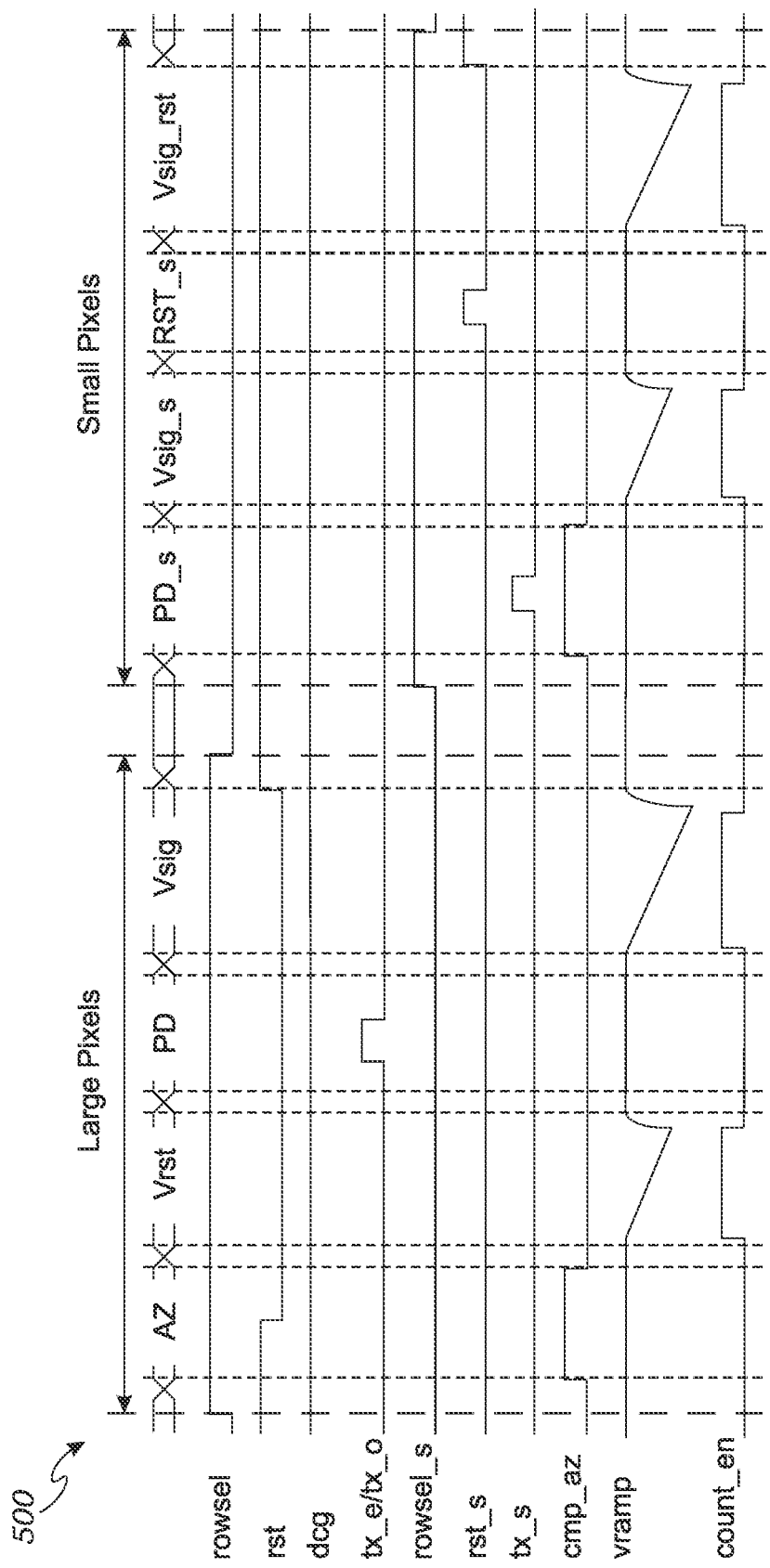
FIG. 5 is a readout timing diagram of an image sensor pixel array according to embodiments of the invention.

FIG. 5 is a readout timing diagram 500 of an image sensor pixel array according to embodiments of the invention. The left side of the diagram mainly deals with the large pixels while the right side deals with the small pixels as evidenced by large pixels row select rowsel going high during the left part of the diagram and the small pixel row select rowsel_s going high during the right part of the diagram. The operation of the invented pixel array can be understood with diagram 500 of FIG. 5 in conjunction with circuit diagram 300 of FIG. 3. By controlling the row selection signals rowsel and rowsel_s, the output signals of large pixels and small pixels are input to the ADC serially to complete A/D conversion. This is an important inventive element enabling the almost simultaneous readout of both LED illuminated scenes as well as normally illuminated scenes by the invented imaging system. While the row selection signal rowsel stays high transistor RS remains on and defines the interval during which the large pixel signal is read out.

For the large pixel imaging signal, ADC quantification is done in the conventional manner. Initially, during an auto-zero phase AZ, the large pixel cell is reset by enabling transistor RST as is shown by control signal rst going high initially then low for most of the large pixel readout period. Also during the AZ phase the comparator and the counter are reset sequentially as well. During a next phase Vrst, the large pixel reset signal Vrst is output to the slope ADC as evidenced by the ramp voltage vramp trending down and the counter enable count_en becoming high. The large pixel reset signal level Vrst is compared with the ramp voltage vramp. The signals vramp and Vrst (both also known as vpixel) are coupled to the inputs of comparator 401 by coupling capacitors C1 and C2 as illustrated in FIG. 4. When vramp is equal to Vrst, the comparator output toggles from digital "high" to digital "low" and this stops the counter from down counting. The counter value directly corresponds to the reset signal level Vrst. When the quantization of the reset signal is completed, the vramp returns to the initial voltage. In a large pixel charge readout phase PD, all signal charges from the photodiodes PD_e and/or PD_o are transferred to floating drain FD by enabling transfer transistors TX_e and/or TX_o by setting control signals tx_e and/or tx_o high for a short time. During the next phase Vsig large pixel imaging signal Vsig is output to the slope ADC as evidenced by the ramp voltage vramp trending down and the counter enable count_en becoming high. The large pixel reset signal level Vsig is compared with the ramp voltage vramp in a manner similar to the readout of imaging signal Vrst. The memory latches the digital code at this moment. The digital code represents the difference between the exposure signal Vsig and the reset signal Vrst, i.e., the quantization result of the large pixel output signal.

For the small pixel signal, ADC quantification is done in an unconventional manner. Initially, during an auto-zero phase not shown, the small pixel cell is reset by enabling transistor rst_s as is shown by control signal rst_s going high at the end of the sequences shown in FIG. 5 and then low for all of the small pixel PD_s readout period of a phase PD_s. Also during phase PD_s the comparator and the counter are reset sequentially as well and all signal charges from photodiode PD_s are transferred to floating drain FD_s by enabling transfer transistor TX_s by setting control signal tx_s high for a short time. During a next phase Vsig_s the small pixel imaging signal is output to the slope ADC as evidenced by the ramp voltage vramp trending down and the counter enable count_en becoming high. In a following interval, a small pixel RST_s phase, the small pixel reset signal level is transferred to FD_s by enabling the reset transistor RST_s by setting the control signal rst_s high for a short time while the comparator and the counter are reset sequentially. During a next phase Vrst_s the small pixel reset level is output to the slope ADC as evidenced by the ramp voltage vramp trending down and the counter enable count_en becoming high. As is done for the large pixel, the slope ADC circuit records the digitized small pixel imaging signal Vsig_s and stores it in memory then records the small pixel reset signal level Vrst_s whereupon following signal processing determines the useful small pixel imaging signal. Normal CDS is not possible for the small pixel readout.

Figure 6:
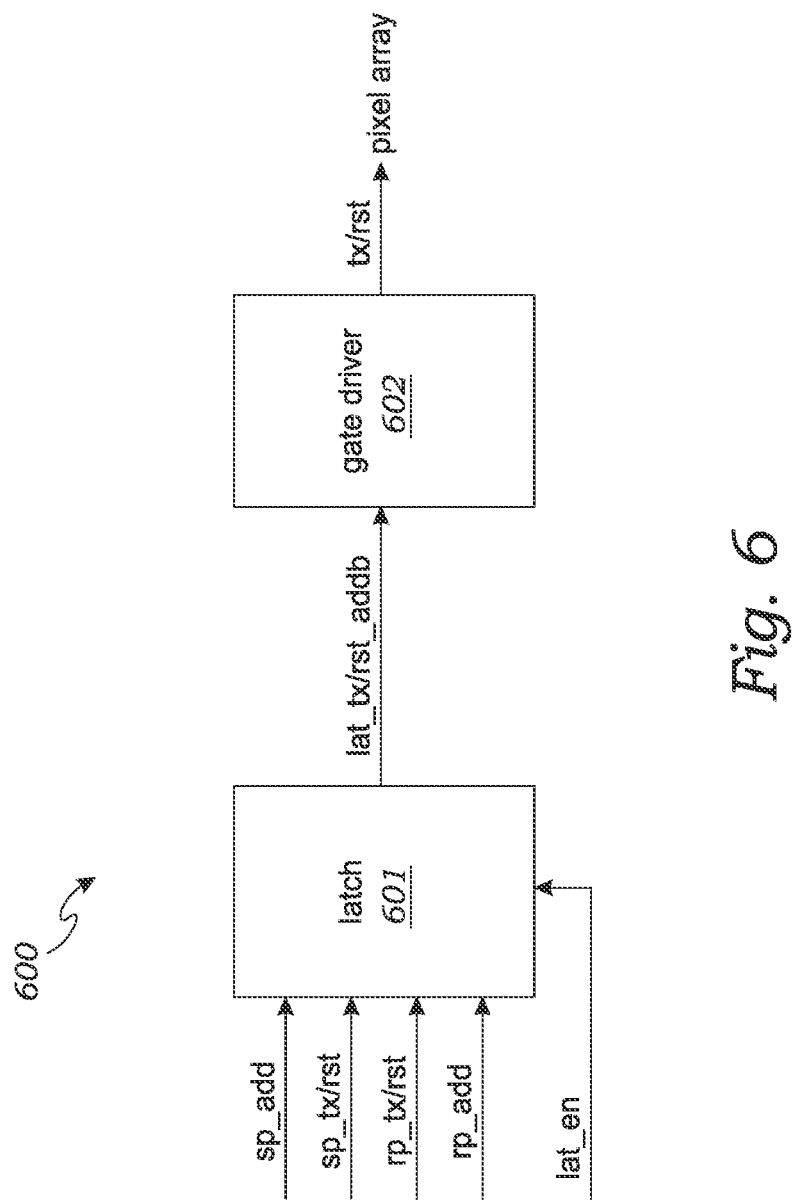
FIG. 6 is a functional block diagram of the transfer gate and reset gate driver circuit as employed in the readout operation of an image sensor pixel array according to embodiments of the invention.

FIG. 6 illustrates functional block diagram 600 used for the transfer gate and reset gate driver circuit as employed in the readout operation of an image sensor pixel array according to embodiments of the invention. This functional block diagram illustrates how the pixel rows that are not being read out, i.e, in the idle state, are controlled so as to avoid their affecting the signals derived from the pixel rows that are being read out. For those idle rows the transfer transistor and reset transistor are continuously turned on to empty their photo-generated electrons since the pixels in idle state will also receive illumination. Thus, it provides an anti-blooming function. FIG. 6 more specifically illustrates a block diagram 600 which provides the transfer gate and reset gate control signals tx/rst to the imaging system and pixel array. The tx driver includes a latch 601 and a gate driver 602. Depending on a exposure row address signal sp_add, a readout row address signal rp_add, a exposure control signal sp_tx, a readout control signal rp_tx, and an enable signal lat_en, a latch 601 outputs a latch address signal lat_tx_addb that is used to control to a gate driver 602 that in turn outputs a gate transmission control signals tx or rst to the pixel array. Gate driver 602 ensures that both the transfer transistors and the reset transistors on the nearby rows are on, which effectively prevents blooming. For the small pixels, the transfer transistor cannot completely isolate the small photodiode PD_s and floating diffusion node FD_s during exposure and so the image signal charges from the PD_s continuously leak to FD_s node. If the reset transistor is on, the charges generated by PD_s are directly cleared. Thus, the rst driver is required to turn off the reset transistor RST_s during exposure. Therefore based on control signals sp_add, rp_add, sp_rst, rp_rst, and lat_en, the latch of the rst signal driver outputs the latch address signal lat_rst_addb to the gate driver as well. The gate driver outputs the gate transmission control signal rst_s.

The readout of the small pixel imaging signal becomes difficult to maintain linearity due to the long exposure time of at least 11ms. To improve small pixel imaging signal output linearity a capacitor Cref may be connected to floating diffusion node FD_s whose potential may be indirectly adjusted by changing a potential vref which is applied to the other Cref terminal. The incorporation of Cref improves the signal charge transfer from PD_s to FD_s and helps to maintain the linear operating range of source follower transistor SF_s. Additionally this arrangement helps to effectively suppress blooming of the small pixel. When $V_{sig\_s}$ and $V_{rst\_s}$ are read out, it is necessary to ensure that the lower plate of the capacitor Cref has the same potential, otherwise the ADC output code cannot correctly represent the small pixel signal charge generated by the small photodiode exposure.

Figure 7:
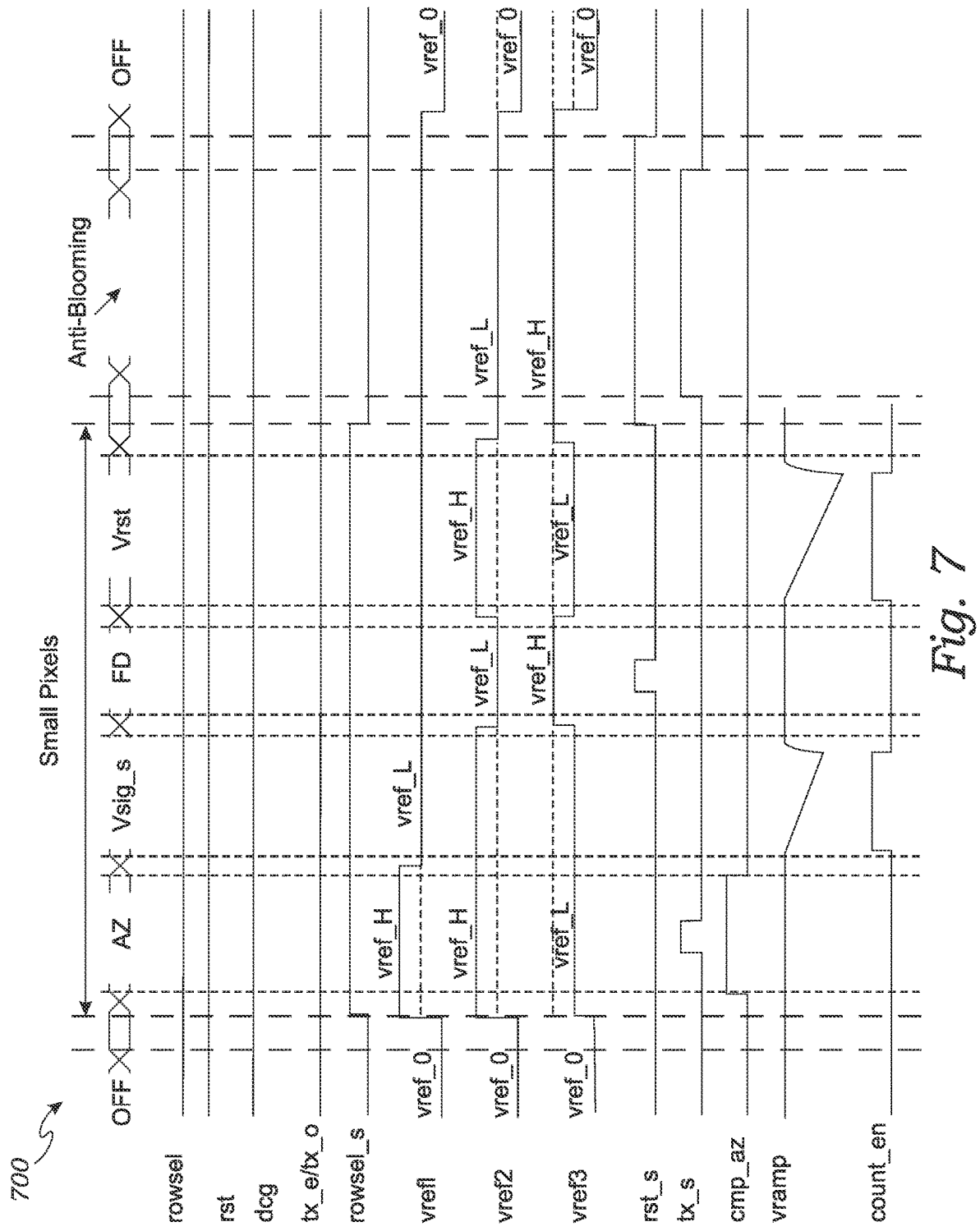
FIG. 7 is a readout timing diagram of an image sensor pixel array according to embodiments of the invention.

FIG. 7 is a readout timing diagram 700 of an image sensor pixel array according to embodiments of the invention, specifically the readout timing diagram for the small pixels wherein the small pixel includes reference capacitor Cref with its Vref bias as illustrated in FIG. 3. As shown in FIG. 7, the present invention provides three types control potential vref1, vref2, and vref3 for the lower plate of capacitor Cref. All signals are low in the OFF phases. For the control potential vref1, during a phase AZ the photodiode imaging charge is transferred to the floating diffusion by enabling tx_s while control potential vref1 is held at vref_H. The purpose is to transfer image charge from PD_s to FD_s more thoroughly. When Vsig_s and Vrst_s are read out, the potential of capacitor Cref's lower plate is maintained at vref_L. For the control potential vref2, the lower plate potential of capacitor Cref is maintained at vref_H when Vsig_s and Vrst_s are read out and the phase AZ. During a reset FD phase, the FD_s potential is higher. To prevent the source follower SF_s from entering the linear region, the FD_s potential is dropped to vref_L. For the control potential vref3, the lower plate potential of capacitor Cref is maintained at vref_L instead of vref_H when Vsig_s and Vrst_a are read out and the phase AZ. This is mainly to reduce the potential of FD_s and prevent SF_s from entering the linear region, which optimizes the photo response non-uniformity (PRNU).

Reference throughout this specification to "one embodiment," "an embodiment," "one example," or "an example" means that a particular feature, structure, or characteristic described in connection with the embodiment or example is included in at least one embodiment or example of the present invention. Thus, the appearances of the phrases such as "in one embodiment" or "in one example" in various places throughout this specification are not necessarily all referring to the same embodiment or example. Furthermore, the particular features, structures, or characteristics may be combined in any suitable manner in one or more embodiments or examples. Directional terminology such as "top", "down", "above", "below" are used with reference to the orientation of the figure(s) being described. Also, the terms "have," "include," "contain," and similar terms are defined to mean "comprising" unless specifically stated otherwise. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

The above description of illustrated examples of the present invention, including what is described in the Abstract, are not intended to be exhaustive or to be limited to the precise forms disclosed. While specific embodiments of, and examples for, the invention are described herein for illustrative purposes, various equivalent modifications are possible without departing from the broader spirit and scope of the present invention. Indeed, it is appreciated that the specific example structures and materials are provided for explanation purposes and that other structures and materials may also be employed in other embodiments and examples in accordance with the teachings of the present invention. These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. An image sensor comprising an imaging array, comprising:
   pixel sub-arrays arranged in rows and columns, wherein the pixel sub-arrays are in turn comprised of a number of constituent pixels;
   wherein a first constituent pixel is a single pixel having an effective sensitivity;
   wherein a second constituent pixel has a higher effective sensitivity than the first constituent pixel;
   wherein the first constituent pixel occupies a corner location on the sub-array between the second constituent pixels on the imaging array;
   an imaging signal readout circuit providing signals and circuits to readout the second constituent pixels and the first constituent pixels;
   wherein the first constituent pixel includes a first floating diffusion connected through a first reset transistor to a system voltage source and a first reference capacitor connected between the first floating diffusion and an adjustable reference voltage supply;
   wherein the first floating diffusion is directly connected to a first source follower transistor which connects the first pixel through a first row select transistor to a column readout line; and wherein the voltage of the first floating diffusion is adjusted by the reference voltage supply through the first reference capacitor; and
   wherein the reference voltage supply provides at one or more independent control voltages each with a low and a high value; and
   wherein the low and high values of the control voltages are applied in different combinations during a first phase image charge transfer to the first floating diffusion, a second phase readout of a corresponding signal on the first source follower transistor, and a third phase reset of the first floating diffusion wherein applying the different combinations of voltages maintains the linearity of the source follower and suppresses blooming during a readout of the first pixel.

2. The imaging array of claim 1 wherein the first constituent pixel includes a photodiode that is small in comparison to photodiodes included in the second constituent pixels; or, there is at least one attenuation layer disposed between the photodiode of the first constituent pixel and an incident light.

3. The imaging array of claim 1 wherein the first constituent pixel includes one photoelectric conversion element, and the second constituent pixel includes at least one photoelectric conversion element.

4. The imaging array of claim 3 wherein the second constituent pixels comprises two or more shared photodiodes adjacent to each other along the row direction of the imaging array; or the second constituent pixel is a shared photodiode pixel with a set of adjacent photodiodes of the same size each having higher effective sensitivity than the first constituent pixel.

5. The imaging array of claim 1 wherein the first constituent pixel acquires a light signal during a pulsing period from a pulsed light source, and wherein the exposure time of the first constituent pixel is greater than the pulsing period of the pulsed light source.

6. The imaging array of claim 1 wherein the one or more control voltages are Vref1, vref2 and vref3 and each may have a low level vref_L and a high level vref_H and during the first phase image charge transfer vref1 has level vref_H, vref2 has level vref_H and vref3 has vref_L and during the second phase readout vef1 has level vref_L, vref2 has level vref_H and vref3 has level vrefL and during the third phase reset of the first floating diffusion vref1 has level vref_L, vref2 has level vref_L and vref3 has level vref_H.

7. The imaging array of claim 1 wherein the second constituent pixel includes double conversion gain (DCG) elements and function to increase conversion gain and HDR.

8. An image sensor comprising an imaging array, comprising:
   pixel sub-arrays arranged in rows and columns, wherein the pixel sub-arrays are in turn comprised of a number of constituent pixels;
   wherein a first constituent pixel is a single pixel having an effective sensitivity;
   wherein a second constituent pixel has a higher effective sensitivity than the first constituent pixel;
   wherein the first constituent pixel occupies a corner location on the sub-array between the second constituent pixels on the imaging array;
   an imaging signal readout circuit providing signals and circuits to readout the second constituent pixels and the first constituent pixels; and
   wherein the first constituent pixel includes a first floating diffusion connected through a first reset transistor to a system voltage source and a first reference capacitor connected between the first floating diffusion and an adjustable reference voltage supply; and wherein the first floating diffusion is directly connected to a first source follower transistor which connects the first pixel through a first row select transistor to a column readout line; and wherein the voltage of the first floating diffusion is adjusted by the reference voltage supply through the first reference capacitor.

9. The image sensor of claim 8 wherein a row and column control circuit includes a latch and gate driver circuit which ensures the pixel sub-arrays on the image sensor array idle rows are actively draining their image charges to minimize blooming of a signal being readout from the selected rows.

10. The image sensor of claim 9 wherein during the control process of the second constituent pixels, transfer transistor and reset transistor of idle rows are controlled to be turned on, and reset transistor of exposed row is controlled to be turned on; and/or, during the control process of the first constituent pixels, transfer transistor and reset transistor of idle rows are controlled to be turned on, and the reset transistor of exposure row is turned off.

11. The image sensor of claim 8 wherein the imaging signal readout circuit provides for reading out the imaging signal from the first constituent pixels followed by resetting the pixels and subsequently reading out the reset signal level.

12. The image sensor of claim 8 wherein the imaging signal readout circuit provides for transferring out to a bit line the imaging signal from the second constituent pixels and the first constituent pixel in a serial or parallel manner by controlling row selection signals associated with each type of constituent pixel.

13. The image sensor of claim 8, wherein the adjustable reference voltage supply provides different levels wherein adjusting the levels maintains the linearity of a source follower amplifier within the first constituent pixel during an image signal capture and readout.

14. A method of operating an image sensor of claim 8, comprising:
   providing an imaging array comprised of pixel sub-arrays arranged in rows and columns wherein the pixel sub-arrays are in turn comprised of a number of constituent pixels, wherein a first constituent pixel is a single pixel having an effective sensitivity, and wherein a second constituent pixel having higher effective sensitivity than the first constituent pixel, and wherein the first constituent pixel occupies a corner location on the sub-array between the second constituent pixels on the imaging array;
   providing imaging signal readout circuit wherein the during readout of the second constituent pixels a reset signal level is initially read out followed by an image signal according to normal correlated double sampling readout and then during the readout of the first constituent pixels the image signal is initially read out followed by a pixel reset and a readout of a reset signal level.

15. The method of operating an image sensor of claim 14 further comprising:
   providing within the first constituent pixel a floating diffusion and a reference capacitor connected between the floating diffusion and an adjustable reference voltage supply.

16. The method of operating an image sensor of claim 15 wherein the adjustable reference voltage supply provides different control signal levels wherein adjusting the levels maintains the linearity of a source follower amplifier within the first constituent pixel during an image signal capture and readout wherein the different levels are provided in different control stages, wherein, the control stages includes an image signal transmission stage, an image signal quantization stage, a reset stage and a reset signal quantization stage.

17. The method of operating an image sensor of claim 16 wherein the potential provided by the control signal corresponding to the image signal quantization stage and the reset signal quantization stage is consistent.

18. The method of operating an image sensor of claim 15 wherein:
   based on the reference capacitor, a first control potential, a second control potential and a third control potential whose voltages are sequentially decreased are provided, wherein:
   an image signal transmission stage has the first control potential, an image signal quantization stage, a reset stage and a reset signal quantization stage all have the second control potential, and the exposure stage has the third control potential; and/or,
   the image signal transmission stage and the image signal quantization stage have the first control potential, the reset stage and the reset signal quantization stage have the second control potential, and the exposure stage has the third control potential; and/or,
   the reset stage has the first control potential, the image signal transmission stage, the image signal quantization stage and the reset signal quantization stage all have the second control potential, and the exposure stage has the third control potential.

* * * * *